United States Patent [19]

Bailly et al.

[11] Patent Number: 4,910,271

[45] Date of Patent: Mar. 20, 1990

[54] PROCESS FOR THE POLYMERISATION OF ETHYLENE OR THE COPOLYMERISATION OF ETHYLENE AND ALPHA-OLEFINS IN A FLUIDISED BED IN THE PRESENCE OF A CHROMIUM BASED CATALYST

[75] Inventors: Jean-Claude A. Bailly, Martigues, France; John G. Speakman, West Lothian, Scotland

[73] Assignee: BP Chemicals Limited, London, England

[21] Appl. No.: 776,470

[22] Filed: Sep. 16, 1985

[30] Foreign Application Priority Data

Sep. 17, 1984 [FR] France .................................. 84 14323

[51] Int. Cl.$^4$ ............................ C08F 2/34; C08F 4/24
[52] U.S. Cl. ..................................... 526/106; 526/105; 526/129; 526/130; 526/352; 526/901; 526/904; 526/908; 525/245; 525/247
[58] Field of Search ................ 526/75, 105, 106, 352, 526/901, 904, 908, 129, 130; 525/245, 247

[56] References Cited

U.S. PATENT DOCUMENTS

| | | |
|---|---|---|
| 2,970,135 | 1/1961 | Lanning et al. ...................... 526/105 |
| 3,158,594 | 11/1964 | Weil et al. ............................ 526/105 |
| 3,922,322 | 11/1975 | Roger et al. ...................... 526/905 X |
| 4,035,560 | 7/1977 | Caumartin et al. ............. 526/901 X |
| 4,295,991 | 10/1981 | Wristers ........................... 526/119 X |
| 4,376,191 | 3/1983 | Geck .................................... 526/102 |
| 4,467,080 | 8/1984 | Brun et al. ...................... 526/904 X |
| 4,517,345 | 5/1985 | Eve et al. ............................. 526/105 |
| 4,564,660 | 1/1986 | Williams et al. ..................... 526/106 |

FOREIGN PATENT DOCUMENTS

| | | | |
|---|---|---|---|
| 004966 | 10/1979 | European Pat. Off. ............ 526/901 |
| 0066204 | 12/1982 | European Pat. Off. ............ 526/105 |
| 0130607 | 1/1985 | European Pat. Off. ............ 526/105 |
| 2059217 | 5/1971 | France .................................. 526/901 |
| 1391771 | 4/1975 | United Kingdom ................ 526/105 |

OTHER PUBLICATIONS

Serial No. 07/157,169, Durand et al., filed Feb. 11, 1988.
Translation of Fr. Pat. 2,059,217 to Peters et al., laid-open 5/71.

Primary Examiner—Joseph L. Schofer
Assistant Examiner—F. M. Teskin
Attorney, Agent, or Firm—Brooks Haidt Haffner & Delahunty

[57] ABSTRACT

The present invention relates to a process for the polymerisation of ethylene or copolymerisation of ethylene and at least one other alpha-olefin, in the gas phase in a fluidised bed reactor, in the presence of a catalyst comprising chromium compounds associated with a granular support comprising a refractory oxide and activated by thermal treatment, which process is characterised in that the catalyst is used in the form of active particles of prepolymer, obtained by bringing the said catalyst in contact with ethylene, alone, or in a mixture with at least one higher alpha-olefin, in such a way that the prepolymer contains from $4 \times 10^{-5}$ to 3 milligram atoms of chromium in the catalyst per gram.

16 Claims, No Drawings

PROCESS FOR THE POLYMERISATION OF ETHYLENE OR THE COPOLYMERISATION OF ETHYLENE AND ALPHA-OLEFINS IN A FLUIDISED BED IN THE PRESENCE OF A CHROMIUM BASED CATALYST

The present invention relates to a process for the polymerisation of ethylene or copolymerisation of ethylene or alpha-olefin in the gas phase by means of a catalyst comprising a chromium oxide associated with a granular support comprising a refractory oxide and activated by heat treatment, for example a "Phillips" type catalyst.

It is already known that ethylene can be polymerised alone or in a mixture with alpha-olefins in the presence of catalyst comprising a chromium oxide compound associated with a granular support comprising a refractory oxide and activated by heat treatment. These catalysts, used in the polymerisation of alpha-olefins and of ethylene in particular, have been described in numerous patents, such as for example British Pat. Nos. 790195 and 804641.

It is also known that such catalysts must preferably comprise at least one chromium compound with a valency equal to 6, in a quantity such that the said catalyst contains at least 0.05% by weight of chromium. However, it has been discovered that the polymerisation of the alpha-olefins may also be carried out under good conditions by means of chromium compounds with varying valencies, mostly less than 6, these compounds being obtained for example by reducing hexavalent chromium compounds before the commencement of polymerisation and/or during the polymerisation itself.

It is known that these catalysts may be prepared by depositing a chromium compound such as a chromium oxide, or a chromium compound which can be converted by calcining into chromium oxide, on a granular support comprising a refractory oxide, then by activation by thermal treatment at a temperature of at least 250° C. and at most equal to the temperature at which the granular support begins to sinter, so that at the end of the thermal treatment the chromium compound is at least partially in the hexavalent state. There also exist numerous methods for modifiying these catalysts, especially by incorporating in them titanium, fluorine or organometallic compounds.

It is also known that alpha-olefins can be polymerised in the gas phase in the presence of such catalysts, especially under a pressure less than 4 MPa and in a fluidised bed reactor in which the solid polymer being formed is maintained in the fluidised state by means of a rising current comprising of a gas mixture consisting basically of ethylene and possibly of alpha-olefins to be polymerised. The gas mixture leaving the reactor is generally cooled before being recycled into the reactor, and an additional quantity of ethylene and possibly alpha-olefins is added to it, corresponding to the quantity consumed. The velocity of fluidisation in the fluidised bed reactor must be sufficiently high to guarantee the homogenisation of the fluidised bed, and to eliminate effectively the heat produced by the polymerisation reaction. The catalyst may be introduced continuously or semicontinuously into the fluidised bed reactor. Withdrawal of the polymer produced may also be performed continuously or semicontinuously. Thus, various methods of production in the gas phase of polyolefins in the presence of chromium based catalysts have already been described in numerous patents, such as for example British Pat. Nos. 810948, 1014205 and 1391771, and American Pat. Nos. 2936303, 3002963, 3023203 and 3300457.

However, experience has shown that a certain number of difficulties appear in controlling the polymerisation reaction in the gas phase when catalysts of this type are employed. More especially, in a fluidised bed polymerisation process, it is important to control the heat exchange of the polymerisation reaction, particularly by controlling the velocity of the rising current providing the fluidisation, and for this reason the form and dimensions of the catalyst particles are important parameters. Thus, when it is desired to increase the fluidisation velocity to comparatively high values, such as for example comprised between 40 and 120 cm/sec, with a view to increasing the yield of the polymerisation reaction, the particles of a catalyst of this type which are introduced into the fluidised bed reactor are too fine and are inevitably entrained outside the fluidised bed, thus causing undesirable reactions outside this bed.

It has already been proposed to use supported catalysts based on chromium oxide, the particles of which are sufficiently large to avoid the above mentioned drawback. However, having in view the fact that polyolefin granules must have a relatively limited size, in order to avoid difficulties during the polymerisation operation, particularly in a fluidised bed reactor, the chromium content in the suggested catalysts must be low, so that the chromium content in the polyolefins could remain below a certain limit beyond which color and/or odour problems could arise. When the chromium content in the supported catalysts is low, gel problems resulting from the relatively high content of support in the polyolefins could however be encountered. Moreover, catalysts of this type can easily be poisoned by the impurities which are present in small quantities in the gaseous mixture.

It has also been proposed to polymerise olefins in the gas phase, by means of supported catalysts based on a metal oxide such as a chromium oxide, by contacting the catalyst with an aluminium hydride or an alkylaluminium in an inert solvent and introducing directly the mixture under pressure into the polymerisation reactor.

Such a method, which has been discussed in the French Pat. No. 2059217, cannot be efficiently operated at the industrial scale with supported catalysts based on chromium oxide, by reason of the behavior of this type of catalyst after it has been brought into contact with olefins.

Experience has also shown that whatever the process of polymerisation used, the chromium based catalysts have an initial activity of nil or close to nil, with an induction period which renders difficult not only the start-up of the polymerisation reaction, but also the maintenance of constant polymerisation conditions in the reaction medium, such as the temperature. When the polymerisation is started, the catalyst activity rapidly accelerates, which renders the polymerisation reaction in a gas phase, particularly in a fluidised bed, difficult to control. Therefore, if the previous contact between the catalyst and an aluminium hydride or an alkylaluminium is long enough to activate the catalyst, the latter could provoke rapid and random variations in the polymerisation conditions in the reaction medium which involve considerable risks of hot spots and bursting into fine particles of the grains forming the fluidised bed. In particular, these hot spots may cause the formation of agglomerates, and setting of the polymer in the interior of the fluidised bed, generally involving the stoppage of polymerisation.

The present invention relates to an improved process for the polymerisation of ethylene or copolymerisation of ethylene and one or more alpha-olefins in the gas phase by means of a fluidised bed, using a catalyst comprising a chromium oxide associated with a granular refractory oxide support and activated by thermal treatment, the catalyst being in the form of active particles of prepolymer having suitable particle size characteristics especially suited to the relatively high speed of fluidisation and possessing an initial catalytic activity such that favorable conditions of polymerisation or copolymerisation are achieved.

The present invention therefore relates to a process for the polymerisation of ethylene, or the copolymerisation of ethylene and at least one higher alpha-olefin comprising 3 to 12 carbon atoms, in the gas phase in a fluidised bed reactor, in the presence of a catalyst comprising a chromium compound associated with a granular refractory oxide support which catalyst has been activated by thermal treatment at a temperature of at least 250° C. and at most equal to the temperature at which the granular support begins to sinter, the activation being carried out in a non-reducing atmosphere, preferably an oxidising atmosphere, which process is characterised in that the catalyst is used in the polymerisation or copolymerisation in the form of catalytically active particles of prepolymer which are obtained during a separate prepolymerisation operation comprising bringing the said catalyst into contact with ethylene, or with a mixture of ethylene and at least one higher alpha-olefin comprising from 3 to 12 carbon atoms, during a period of time such that the produced prepolymer contains from $4 \times 10^{-5}$ to 3 and preferably from $10^{-3}$ to $10^{-1}$ milligram atoms of chromium per gram, and separating the prepolymer from the unreacted quantity of ethylene or the mixture of ethylene with at least one higher alpha olefin.

It has surprisingly been found that the prepolymers prepared and used according to the invention, which have been separated from the unreacted quantity of ethylene or of the mixture of ethylene with at least one higher alpha olefin, possess an initial catalytical activity substantially less than the same prepolymer which has not been separated from the unreacted olefins. During the course of polymerisation or copolymerisation, the catalytical activity of the prepolymers progressively increases to the activity level of the unseparated prepolymer. This permits the avoidance of the above mentioned drawbacks, which could lead to the formation of agglomerates or fine particles of polymers or copolymers, and facilitates the production of polymers or copolymers having the desired properties and with a relatively low content of catalyst residues.

The catalysts used according to the invention can be obtained by a large number of known processes, especially by those according to which, in a first stage, a chromium compound such as a chromium oxide generally of the formula $CrO_3$, or a chromium compound which can be converted by calcining into chromium oxide, such as for example a chromium nitrate or chromium sulphate, an ammonium chromate, a chromium carbonate, a chromium acetate, a chromium acetylacetonate or a tertbutyl chromate, is associated with a granular support based on a refractory oxide such as, for example, silica, alumina, zirconium oxide, thorium oxide, titanium oxide or mixtures or coprecipitates of two or several of these oxides. In a second stage, the chromium compound associated with the granular support is activated by thermal treatment at a temperature of at least 250° C. and at most equal to a temperature which the granular support begins to sinter; the temperature of the thermal treatment is generally comprised between 250° and 1200° C., and preferably comprised between 350° and 1000° C. This thermal treatment is carried out under a non-reducing atmosphere, preferably an oxidising atmosphere, generally consisting of a gas mixture comprising oxygen, such as for example air. The duration of the thermal treatment may be between 5 minutes and 24 hours, preferably between 30 minutes and 15 hours so that at the end of this treatment the chromium compound is at least partially in the hexavalent state. The content by weight of chromium of the catalyst thus obtained is generally comprised between 0.05 and 30%, and preferably between 0.1 and 3%.

The granular supports based on a refractory oxide used in the preparation of catalysts according to the invention generally occur in the form of solid particles which preferably have a mean diameter by mass comprised between 20 and 300 microns. These granular supports may be obtained by various known processes, particularly by the precipitation of silicon compounds, such as silica, from a silicate solution of an alkali metal, or else by coprecipitation of a gel or hydrogel of refractory oxide from solutions comprising at least two compounds chosen from amongst compounds of silicon titanium, zirconium, thorium or aluminium. Such processes are described in particular in American Pat. Nos. 4053436 and 4101722. Another method for preparing the catalysts according to the invention consists in preparing a support of silica and of titanium oxide by calcining a compound of titanium, such as tetraisopropoxide of titanium, deposited on a silica, at a temperature comprised between 500° and 900° C. in an atmosphere of dry air, impregnating the support with a chromium compound, such as tertiary butyl chromate and activating the resulting product by heat treatment. Such a method is discussed, for example in the American Pat. No. 3879362.

One may also use a catalyst obtained in a first stage by coprecipitating at least one refractory oxide, such as silica or alumina and a chromium compound to form a co-gel. In a second stage this co-gel is dried and thereafter activated by thermal treatment.

Another technique for preparing catalysts which can be used according to the invention consists in carrying out the activation in the presence of certain titanium compounds, such as titanium tetraisopropoxide, according to a method described for example in French Pat. No. 2134743.

Another preferred method for preparing the catalysts according to the invention consists in performing the activation in the presence of fluorine compounds chosen among hexafluorotitanate, tetrafluoroborate or hexafluorosilicate of ammonium, possibly in the presence of a titanium compound chosen among titanium alcoholates, this method enabling advantageously to increase the activity of these catalysts or to modify the properties of the polyolefins produced. For example, the American Pat. No. 3130183 describes a supported catalyst based on chromium oxide, this catalyst being activated in the presence of fluorine compound, such as an ammonium fluorosilicate. Another method described in British Pat. No. 1391771 consists in performing the activation of the supported catalyst based on chromium oxide in the presence on the one hand of a titanium compound, such as a titanium alcoholate, for example titanium tetraisopropoxide and on the other hand of a fluorine compound, such as ammonium hexafluorotitanate, ammonium tetrafluoroborate or ammonium hexafluorosilicate. The content by weight of fluorine in these catalysts is preferably comprised between 0.05 and 8% by weight.

The catalysts may also be modified by bringing them into contact with organo-metallic compounds, such as an alkylaluminium alcoholate as described for example in French Pat. No. 2269537.

According to the invention it is preferred to use catalysts comprising a chromium compound and a titanium compound to produce polymers or copolymers of ethylene having in particular a comparatively low mean molecular weight. The content by weight of titanium of these catalysts is generally comprised between 0.1 and 20% and preferably between 0.5 and 8%.

According to the invention the prepolymers are obtained by polymerisation of ethylene, or a mixture of ethylene with at least one higher alpha-olefin comprising 3 to 12 carbon atoms in the presence of the defined catalyst. As higher alpha-olefins to be used in a mixture with ethylene it is preferred to use propylene, 1-butene, 1-hexene, 4-methyl-1-pentene or 1-octene. The prepolymerisation may be effected either in suspension in a liquid hydrocarbon medium or in the gas phase in a fluidised bed reactor, or in a reactor provided with a mechanical stirrer, or in a fluidised bed reactor provided with a mechanical stirrer, at a temperature which is lower than the temperature at which the prepolymer particles begin to soften and to form agglomerates, preferably at a temperature between 40° and 115° C.

The prepolymerisation is stopped when the prepolymer contains from $4 \times 10^{-5}$ to 3, and preferably from $1 \times 10^{-3}$ to $10^{-1}$ milligram atoms of chromium per gram, the particles of the prepolymer having a mean diameter by mass comprised, preferably between 40 and 1000 microns, more preferably between 80 and 500 microns. The above mentioned chromium content and dimensions are very suitable for polymerisation is a fluidised bed.

The prepolymerisation may be carried out in two or more stages if desired. In this case the first prepolymerisation stage (which is referred to as the stage of coating the catalyst) is carried out by the polymerisation of ethylene or copolymerisation of ethylene and at least one higher alpha-olefin in a liquid hydrocarbon medium. Generally this stage may be continued until the coated catalyst obtained contains from 0.1 to 10 g of polymer or copolymer per milligram atom of chromium. The second prepolymerisation stage can be performed either in a liquid hydrocarbon medium or in the gas phase; generally this stage is continued, until the prepolymer contains from $4 \times 10^{-5}$ to 3, and preferably from $1 \times 10^{-3}$ to $10^{-1}$ milligram atoms of chromium per gram. The dimensions of the particles of the prepolymer are preferably comprised in the limits which have been recited above.

The prepolymerisation may be carried out advantageously in the presence of at least one organometallic compound (a) of a metal of groups I to III of the Periodic Table of Elements. The organometallic compound (a) is chosen for preference from amongst the organo-aluminium, organo-magnesium and organo-zinc compounds or a mixture of these compounds. As organo-aluminium compounds, one may select a trialkylaluminium, a hydride or an alcoholate of alkylaluminium. Preferably a trialkylaluminium is used such as triethylaluminium, or an alcoholate of alkylaluminium such as diethylaluminium ethoxide. The quantity of organo-metallic compound (a) used in prepolymerisation is such that the atomic ratio of the quantity of metal in the said organo-metallic compound (a) to the quantity of chromium in the catalyst is comprised between 0.01 and 30 and preferably between 0.1 and 1.

The organo-metallic compound (a) is used advantageously during the prepolymerisation, in order to improve the start-up of the prepolymerisation reaction and especially to reduce, or to eliminate, the induction period during this reaction. Moreover, experience has shown that in certain cases the presence of an organometallic compound (a) such as an alkylaluminium alcoholate during the prepolymerisation makes it possible to reduce substantially the formation of waxes which are mainly constituted of polymers or copolymers soluble in n-hexane at 60° C. and which tend to render the particles of prepolymer sticky and to alter their polymerisation activity. Therefore, it is particularly advantageous to prepare prepolymers having a content of polymer or copolymer soluble in n-hexane at 60° C. of less than or equal to 2.0% by weight.

The prepolymerisation may also be performed in the presence of hydrogen to control the molecular weight of the prepolymer produced, especially if the latter is obtained in the presence of the organometallic compound (a).

The prepolymer is separated from the unreacted quantity of ethylene or from the mixture of ethylene with at least one higher olefin. This operation can be performed either by degassing the polymerisation medium in which the prepolymer is prepared, care being taken that no impurities which would impair the catalyst, such as air or moisture enter into contact with the prepolymer, or by stopping the introduction of ethylene or of the mixture of ethylene with at least one higher olefin, until no substantial quantity of ethylene or of the mixture remains in the polymerisation medium.

Before using the prepolymer in the polymerisation of ethylene or the copolymerisation of ethylene with at least one higher olefin, it is advantageous to perform one or more of the following subsidiary operations.

It is favorable to submit the prepolymer, before it is used in in the fluidised bed polymerisation reactor, to one or more extraction operations by means of a liquid hydrocarbon such as n-hexane. These extraction operations make it possible to eliminate the waxes which may form during prepolymerisation and which consist essentially of polymers or copolymers soluble in n-hexane at 60° C. These waxes are particularly undesirable during the drying of the prepolymers, because they tend to stick the particles of prepolymer together and to form agglomerates. In this way these waxes may be eliminated efficiently from the prepolymer particles which may have a content or polymer or copolymer soluble in n-hexane at 60° C. of less than or equal to 2.0% by weight. These extraction operations also make it possible to create porosity inside the prepolymer particles, and in particular they favor the accessibility of the ethylene and the higher alpha-olefins to the catalyst sites. This porosity also makes it possible to impregnate the prepolymer more efficiently with liquid compounds, such as organometallic compounds, and thus to protect the active sites better against possible poisons.

It is also possible to add an organometallic compound (b) to the prepolymer, at the end of the preparation of the prepolymer, as explained further into detail in this disclosure.

Finally, the prepolymer is preferably obtained as a dry powder, which means that it is preferably separated from the liquid hydrocarbon medium in which it may have been prepared.

The prepolymers, which contain the active chromium based catalyst, are brought into contact with ethylene or a mixture or ethylene and at least one higher alpha olefin under polymerisation or copolymerisation conditions in the gas phase in a fluidised bed reactor, preferably in the presence of an organometallic compound (b) of a metal of Groups I to III of the Periodic Table of Elements. As organometallic compound (b), one may use organoaluminium, organomagnesium and organozinc compounds or a mixture of these compounds, and especially trialkyl aluminiums, hydrides or alcoholates of alkyl aluminium. The organometallic compound (b) may be identical to or different from organometallic compound (a).

The presence of the organometallic compound (b) during the polymerisation or copolymerisation in the gas phase in a fluidised bed reactor makes it possible to increase advantageously the yield of the reaction. In particular it makes it possible to destroy the poisons present in the reaction medium and also to improve the control of the mean molecular weight, and the distribution of the molecular weights of the polymer or copolymer produced.

The organometallic compound (b) may be added to the prepolymer at the end of prepolymerisation, preferably after the extraction operations by means of a liquid hydrocarbon, but before the introduction of the said prepolymer into the fluidised bed reactor. In particular it may be added to the prepolymer which has been previously placed in suspension in the liquid hydrocarbon, such as n-hexane, and in this case introduced in the pure state into the said suspension. The prepolymer is finally obtained in the form of a powder after evaporating the liquid hydrocarbon.

It is also possible to introduce the organometallic compound (b) direct into the fluidised bed reactor, independently of the prepolymer. In this case it is particularly advantageous to dissolve the organometallic compound (b) beforehand in a saturated aliphatic hydrocarbon comprising, for example, from 4 to 7 carbon atoms, in order to facilitate its dispersion in the fluidised bed, and its contact with the prepolymer introduced elsewhere.

The organometallic compound (b) may also be used advantageously by combining the two previous methods. In particular it may be added in part to the prepolymer prior to its introduction into the fluidised bed reactor and in part introduced separately from the prepolymer into the fluidised bed reactor. These two parts of organometallic compound (b) may be of an identical or different nature.

Whatever the method employed for using the organometallic compound (b), the latter is used in a quantity such that the atomic ratio of the quantity of the said organometallic compound (b) to the quantity of chromium in the catalyst contained in the prepolymer is at most equal to 100, preferably comprised between 0.1 and 20 and more especially comprised between 0.5 and 4. As a consequence, the total quantity of organometallic compounds (a) and (b) is such that the atomic ratio of the quantity of metal in the said organometallic compounds to the quantity of chromium in the catalyst is at most equal to 130 and preferably comprised between 0.1 and 21.

It has also been found, which constitutes a part of the invention, that the presence of the organometallic compound (b) during the polymerisation or copolymerisation in the gas phase makes it possible to control the mean molecular weight of the polymer or the copolymer, in the absence or in the presence of hydrogen in the gaseous mixture containing ethylene or a mixture of ethylene and at least one higher alpha olefin. In the absence of hydrogen, the mean molecular weight of the polymer or the copolymer is increased when the atomic ratio of the organometallic compound (b) to the quantity of chromium in the catalyst contained in the prepolymer is increased. This corresponds to a decrease of the melt flow ratio of the polymer or the copolymer when the above ratio is increased. Surprisingly, it has been found that in the presence of hydrogen, and of the organometallic compound (b), the mean molecular weight of the polymer or the copolymer is decreased when the ratio of hydrogen to ethylene in the gaseous mixture is increased, which means that the melt flow ratio of the polymer or the copolymer increases when the proportion of hydrogen in the gaseous mixture is increased, all other parameters remaining the same. This result is unexpected, since it is known that hydrogen does not show any substantial effect on the mean molecular weight of polymer obtained in the presence of supported chromium based catalysts. The useful values of the above mentioned ratios are defined further in this disclosure.

Bringing the prepolymer into contact with ethylene or with a mixture of ethylene and at least one higher alpha olefin in the conditions of polymerisation or copolymerisation in a fluidised bed is performed by techniques which are in themselves known. In particular, the gaseous mixture comprising ethylene and possibly higher alpha-olefin to be polymerised flows upwardly through the fluidised bed, which consists of particles of polymer or copolymer in course of formation. The ethylene and possibly the higher alpha-olefin are introduced into the fluidised bed reactor at a temperature such that the reaction medium is at a temperature of at least 50° C. and advantageously at least 80° C., but lower than the temperature at which the particles of polymer or of copolymer begin to soften and to from agglomerates, preferably lower than 115° C.

The velocity of fluidisation of the gaseous mixture is preferably comparatively high, so as to guarantee good homogenisation of the fluidised bed, without having recourse to any other means of homogenisation, especially mechanical, in order to eliminate efficiently the heat released by polymerisation and to increase the yield of polymerisation. This fluidisation velocity is generally comprised between 3 and 10 times the minimum velocity which is necessary for fluidising the particles of polymer or copolymer in the course of growth, in most cases the gas velocity is comprised between about 40 and 120 cm/sec, preferably comprised between 50 and 100 cm/sec and more especially comprised between 60 and 90 cm/sec. In flowing through the fluidised bed only a part of the ethylene and any higher alpha-olefin polymerises in contact with the particles of polymer or copolymer in the course of growth. The fraction of ethylene and any alpha-olefin which is not reacted leaves the fluidised bed and passes through a cooling system, in order to eliminate the heat produced during the reaction, before being recycled into the fluidised bed reactor, by means of a compressor.

The total pressure in the reactor may be in the vicinity of atmospheric pressure, but is preferably higher in order to increase the polymerisation speed. It may be comprised between 0.5 and 4 MPa, and preferably comprised between 0.8 and 3 MPa.

In order to control, and in particular to reduce the molecular weight of the polymers or copolymers produced, it is possible to vary the ratio of organometallic compound (b) to the quantity of chromium in the catalyst contained in the prepolymer, in the above mentioned range and possibly to add to the gas mixture circulating in the fluidised bed reactor hydrogen in a quantity such that the molar ratio of hydrogen to ethylene and any higher alpha-olefin is not greater than 5 and is preferably comprised between 0.1 and 1. For the same purpose, it is also possible to vary the temperature of polymerisation.

The gas mixture may also comprise an inert gas in a quantity such that the molar ratio of inert gas to ethylene and any higher alpha-olefin is not greater than and is preferably comprised between 0.1 and 2. This inert gas may be chosen from amongst nitrogen, methane, ethane, propane, butane, isobutane or a mixture of these gases. In particular it makes it possible to improve appreciably the elimination of reaction heat and to modify favorably the kinetics of the polymerisation.

Furthermore the gas mixture may comprise one or more higher alpha-olefin comprising from 3 to 12 carbon atoms, preferably chosen from amongst propylene, 1-butene, 1-hexene, 4-methyl-1-pentene and 1-octene.

The polymer can be removed from the reaction vessel by means of various mechanical devices. The preferred device comprises providing the lower portion of the reaction vessel with an aperture which is capable of being closed and which communicates with a chamber having a pressure lower than that in the reaction vessel. Opening the aperture for a given time makes it possible to remove into the chamber the desired amount of polymer. When the apparatus is closed, the chamber can be brought into communication with the exterior for the polymer to be collected.

The process of the invention is preferably carried out in a manner such that the operating conditions of the reaction vessel are substantially constant. This mode of operation can be achieved, in practice, by circulating in the reaction vessel a gaseous mixture having substantially constant characteristics, formed for the most part of recycled gaseous mixture.

In this way it is possible to produce under very satisfactory industrial conditions, a large number of polymers of ethylene, in particle form, including polyethylenes and copolymers of ethylene with higher alpha-olefins, such as high density polyethylene (density comprised between 0.970 and greater than or equal to 0.940), amongst which may be mentioned the homopolymers of ethylene and the copolymers of ethylene and higher alpha-olefins comprising 3 to 12 carbon atoms, having a content by weight of units derived from ethylene of greater than or equal to 97%, or linear low density polyethylene (density comprised between 0.900 and 0.940), consisting of copolymer of ethylene and at least one higher alpha-olefin comprising 3 to 12 carbon atoms, having a content by weight of units derived from ethylene comprised between 80 and 97%. The chromium content in the polymers or in the copolymers is generally less than 20 ppm and usually less than 5 ppm.

The polyethylene and ethylene copolymer powders prepared by the gas fluidised bed polymerisation process of the present invention have a mean particle diameter in the range 100 to 4000 microns, preferably 300 to 1600 microns and most preferably 500 to 1200 microns. The powder bulk densities are generally in the range 0.35 to 0.53 gcm$^{-3}$, and preferably 0.40 to 0.50 gcm$^{-3}$.

The polymers of ethylene and copolymers of ethylene and higher alpha-olefin, obtained according to the present invention have the advantage of possessing a broad distribution of molecular weights. This may be characterised by the ratio between the mean molecular weight by mass, Mw, and the mean molecular weight by number, Mn, of the polymers or copolymers measured by gel permeation chromatography (GPC), this ratio usually being greater than 6. This distribution of the molecular weights may also be characterised by the flow parameter, n, which is greater than 1.8 and generally greater than 2.0, this flow parameter being calculated according to the following equation:

$$n = log(MI_{21.6}/MI_{8.5})/log\, 21.6/8.5)$$

in which $MI_{21.6}$ and $MI_{8.5}$ are melt indices of the polymers or copolymers measured at 190° C. under a load of 21.6 kg (ASTM.D 1238-57 T, condition F) and 8.5 kg respectively.

MEASUREMENT OF THE MOLECULAR WEIGHT DISTRIBUTION

The molecular weight distribution of a polymer or copolymer is calculated by the ratio of the mean molecular weight by mass, Mw, to the mean molecular weight by number, Mn, of the polymer or copolymer, from a distribution curve of the molecular weights obtained by means of a gel permeation chromatograph of the "DU PONT" make, type "860" (High Temperature Size Exclusion Chromatograph), provided with a pump of the "DU PONT" make, type "870", the operating conditions being as follows:
solvent: trichloro-1,2,4-benzene
solvent throughput: 0.8 ml/minute
three columns of "DU PONT" manufacture with "Zorbax" packing, with a particle size of 6 microns and a porosity of 60 A, 1000 A, and 4000 A respectively are used
temperature: 150° C.
sample concentration: 0.15% by weight
injection of volume: 300 ml
infra-red detection, at a wave length of 3425 microns, by means of a cell 1 mm thick,
standardisation by means of a high density polyethylene sold by BP Chimie SA under the trade name "Natene 6055" (®): Mw=70 000 and Mw/Mn=3.8.

METHOD FOR THE DETERMINATION OF THE MEAN DIAMETER BY MASS (Dm) OF THE PARTICLES OF SUPPORT, CATALYST, PREPOLYMER, AND POLYMER OR COPOLYMER

The mean diameter by mass (Dm) of the particles of support, catalyst, prepolymer and polymer or copolymer is measured from microscope observations by means of the OPTOMAX image analyser (Micro-Measurements Limited—Great Britain). The measuring principle consists in obtaining from the experimental study by optical microscopy of a population of particles, a table of absolute frequency giving the number ($n_i$) of particles belonging to each class (i) of diameters, each class (i) being characterised by an intermediate diameter ($d_i$), comprised between the limits of the said class. According to approved French standard NF X 11-630 of Jun. 1981, Dm is provided by the following formula: mean diameter by mass:

$$Dm = (\Sigma n_i (d_i)^3 d_i)/(\Sigma n_i (d_i)^3)$$

Measurement by the OPTIMAX image analyser is performed by means of an inverted microscope which makes it possible to examine suspensions of support particles, of catalyst, of prepolymer, or polymer or of copolymer at an enlargement comprised between 16 and 200 times. A television camera picks up the images given by the inverted microscope and transmits them to a computer which analyses the images line by line and dot by dot on each line, with a view to determining the dimensions or diameters of the particles and then classifying them.

The polymer or copolymer densities throughout this specification are the densities as measured according to ASTM D 1505.

The following non-restrictive Examples illustrate the invention.

EXAMPLE 1

PREPARATION OF THE CATALYST

For 5 hours a catalyst powder sold by Joseph Crosfield and Sons (Warrington, Great Britain) under the trade name "EP 20" (®)is subjected to thermal treatment at 815° C. in a fluidised bed reactor by means of a current of dry air. This catalyst consists of chromium oxide, ($CrO_3$), associated with a silica support and containing 1% by weight of chromium. After treatment and cooling to ambient temperature (20° C.), the catalyst (A) obtained occurs in the form of a powder consisting of particles with a mean diameter by mass of 125 microns. It is maintained under an atmosphere of nitrogen during storage.

PREPOLYMERISATION IN SUSPENSION

Into a 1000 liter stainless steel reactor, equipped with a stirrer system rotating at 140 revolutions per minute, there are introduced under an atmosphere of nitrogen 500 liters of n-hexane heated to 75° C., then 264 millimoles of diethylaluminiumethoxide and 5.5 kg of catalyst (A) prepared previously. Ethylene is then introduced at a throughput of 15 kg/h, for 4 hours. At the end of this period the prepolymer suspension thus obtained is maintained at a temperature of 75° C. for 30 minutes in order to consume to the maximum extent the ethylene which has not reacted. The reactor is then degassed, then cooled to 60° C.

300 liters of n-hexane previously heated to 60° C. are added to the prepolymer suspension which is maintained under these conditions, with stirring, for 15 minutes before extracting from this suspension approximately 300 liters of liquid phase. This operation is repeated twice, then the prepolymer suspension is cooled to ambient temperature (20° C.) and 2120 millimoles of triethylaluminium are added to it. After drying under nitrogen, approximately 60 kg of prepolymer (B) are obtained in the form of a powder consisting of particles with a mean diameter by mass of 190 microns and containing $1.6 \times 10^{-2}$ milligram atoms of chromium per gram and less than 2.0% by weight of polymer soluble in n-hexane at 60° C.

FLUIDISED BED POLYMERISATION

One operates by means of a stainless steel fluidised bed reactor with a diameter of 45 cm, fluidisation being provided by a rising gas mixture propelled at a velocity of 82 cm/s, at a temperature of 96° C.; this gas mixture consists of nitrogen and ethylene, the partial pressures (pp) of these ingredients being as follows:

pp nitrogen = 0.95 MPa
pp ethylene = 1.05 MPa

There are introduced into this reactor 70 kg of an anhydrous polyethylene powder which is carefully degassed, as charge powder. There are then introduced into this reactor in a sequential manner, at a frequency of once every 5 minutes, 4.7 grams of prepolymer (B) as prepared previously.

At the end of about 3 hours, when the polyethylene production has become regular, there are introduced continuously into the reactor 10 ml/hr of a molar solution of tri-n-octylaluminium in n-hexane. By means of sequenced withdrawal, 28 kg/hr of polyethylene powder are collected in order to maintain the fluidised bed at a constant height in the reactor. After 8 hours of operation under these conditions, the charge powder introduced initially into the reactor is practically completely eliminated, and a polyethylene powder is obtained having the following characteristics:

density: 0.950 (at 20° C.);
chromium content: less than 2 ppm;
high load melt index ($MI_{21.6}$), measured at 190° C. under a load of 21.6 kg: 2.0 g/10 minutes;
bulk density: 0.43 g/cm$^3$;
mean diameter by mass of the particles: 900 microns;
flow parameter, n: 2.5;
unsaturation level of vinyl, vinylidene and vinylene types respectively equal to 0.111, 0.013 and 0.005 per 100 atoms of carbon.

EXAMPLE 2

PREPARATION OF THE CATALYST

A catalyst comprising 1% by weight of chromium as a chromium oxide having the formula $CrO_3$ and 2% by weight of titanium as a titanium oxide having the formula $TiO_2$, associated with a granular support of silica having a high pore volume above 1.8 ml/g is obtained after a heat treatment at 850° C. during 5 hours in a fluidised bed reactor, by means of a current of dry air. The catalyst obtained (C) is cooled to ambient temperature (20° C.) and occurs in the form of a powder consisting of particles having a mean diameter by mass of 150 microns. It is maintained under an atmosphere of nitrogen during storage.

PREPOLYMERISATION IN SUSPENSION

One operates exactly as in Example 1, except for the fact that instead of using the catalyst (A), one uses the catalyst (C). About 60 kg of prepolymer (D) are obtained having a mean diameter by mass of 300 microns and containing $1.7 \times 10^{-2}$ milligram atoms of chromium per gramme and less than 2.0% by weight of polymer soluble in n-hexane at 60° C.

FLUIDISED BED COPOLYMERISATION

One operates by means of a stainless steel fluidised bed reactor with a diameter of 45 cm, fluidisation being provided by a rising gas mixture propelled at a velocity of 82 cm/sec, at a temperature of 98° C.; the gas mixture consists of hydrogen, ethylene and nitrogen, the partial pressures (pp) of these ingredients being as follows:
pp hydrogen: 0.36 MPa
pp ethylene: 1.05 MPa
pp nitrogen: 0.593 MPa Into this reactor there are introduced 70 kg of an anhydrous polyethylene powder which is carefully degassed as charge powder. There are then introduced into this reactor in a sequence at the frequency of once every 5 minutes, 4 g of the prepolymer (D).

At the end of about 3 hours, when the polyethylene production has become regular, there are introduced continuously into the reactor 10 ml/hr of a molar solution of tri-n-octylaluminium in n-hexane. By means of sequenced withdrawal, 28 kg/hr of polyethylene powder are collected in order to maintain the fluidised bed at a constant height in the reactor. After 8 hours of operation under these conditions, the charge powder introduced initially into the reactor is practically completely eliminated, and a polyethylene powder is obtained having the following characteristics:
density: 0.953 (at 20° C.);
chromium content: less than 2 ppm;
melt index ($MI_{8.5}$), measured at 190° C. under a load of 8.5 kg: 1.5 g/10 minutes;
bulk density: 0.43 g/cm$^3$;
mean diameter by mass of the particles: 900 microns;
molecular weight distribution, Mw/Mn: 7.7;
flow parameter, n: 2.15;
unsaturation level of vinyl, vinylidene and vinylene types respectively equal to 0.113, 0.014 and 0.006 per 100 atoms of carbon.

EXAMPLE 3

FLUIDISED BED POLYMERISATION

One operates exactly as in Example 2, except for the fact the fluidisation is provided by a gas mixture consisting of hydrogen, ethylene and nitrogen, the partial pressures (pp) of these three ingredients being as follows:
pp hydrogen: 0.704 MPa
pp ethylene: 1.05 MPa
pp nitrogen: 0.246 MPa A polyethylene powder is obtained having the following characteristics:
density: 0.953 (at 20° C.);
chromium content: less than 2 ppm;
melt index $MI_{8.5}$: 3 g/10 minutes;
bulk density: 0.40 g/cm$^3$;
mean diameter by mass of the particles: 1500 microns;
Mw/Mn 7.5;
flow parameter, n: 2.10;
unsaturation level of vinyl, vinylidene and vinylene types respectively equal to 0.115, 0.012 and 0.008 per 100 atoms of carbon.

EXAMPLE 4

FLUIDISED BED COPOLYMERISATION

One operates by means of a stainless steel fluidised bed reactor with a diameter of 45 cm, fluidisation being provided by arising gas mixture propelled at a speed of 82 cm/sec, at a temperature of 90° C.; the gas mixture consists of hydrogen, ethylene, 1-butene and nitrogen, the partial pressures (pp) of these four ingredients being as follows:
pp hydrogen: 0.204 MPa
pp ethylene: 1.05 MPa
pp 1-butene: 0.021 MPa
pp nitrogen: 0.725 MPa Into this reactor there are introduced 70 kg of an anhydrous polyethylene powder which is carefully degassed, as charge powder. There are then introduced into this reactor in a sequence at the frequency of once every 5 minutes, 3.2 g of the prepolymer (D) prepared in Example 2.

At the end of about 3 hours the production of copolymer of ethylene and 1-butene has become regular, and there are introduced continuously into the reactor 10 ml/hr of a molar solution of tri-n-octylaluminium in n-hexane. By a sequenced withdrawal one collects about 30 kg/hr of copolymer powder in order to maintain the fluidised bed at a constant height in the reactor. After 8 hours of operation under these conditions, the charge powder initially introduced into the reactor is practically completely eliminated and a powder is obtained of copolymer of ethylene and 1-butene having the following characteristics:
density: 0.938 (at 20° C.);
content by weight of units derived from 1-butene: 1.3%
chromium content: less than 2 ppm:
melt index, $MI_{8.5}$: 6.1 g/10 minutes;
bulk density: 0.38 g/cm$^3$;
mean diameter by mass of the particles: 1600 microns;
Mw/Mn: 7
flow parameter, n: 2.10;
unsaturation level of vinyl, vinylidene and vinylene types respectively equal to 0.118, 0.015 and 0.005 per 100 carbon atoms.

EXAMPLE 5

PREPARATION OF THE CATALYST

For 5 hours a catalyst powder sold by Joseph Crosfield and Sons (Warrington, Great Britain) under the trade name "SD 575" (®) is subjected to thermal treatment at 800° C. in a fluidised bed reactor by means of a current of dry air. This catalyst consisting of chromium oxide, of the formula $CrO_3$, associated with a silica support, contains 1% by weight of chromium. After treatment and cooling to ambient temperature (20° C.), the catalyst (E) obtained occurs in the form of a powder consisting of particles having a mean diameter by mass of 87 microns. It is maintained under an atmosphere of nitrogen during its storage.

PREPOLYMERISATION IN SUSPENSION

Into a 1000 liter reactor in stainless steel, equipped with a stirrer system rotating at 140 revolutions per minute, there are introduced under an atmosphere of nitrogen 500 liters of n-hexane heated to 75° C., then 290 millimoles of diethylaluminiumethoxide and 5.5 kg of catalyst (E) prepared previously. Ethylene is then introduced at a flow rate of 15 kg/h, for 4 hours and 25 minutes. At the end of this period the prepolymer suspension thus obtained is maintained at a temperature of 75° C. for 30 minutes in order to consume to the maximum extent the ethylene which has not reacted. The reactor is then degassed, then cooled to 60° C.

300 liters of n-hexane previously heated to 60° C. are added to the prepolymer suspension which is maintained under these conditions, with stirring, for 15 minutes before extracting from this suspension approximately 300 liters of liquid phase. This operation is repeated twice, then the prepolymer suspension is cooled to ambient temperature (20° C.) and 288 millimoles of triethylaluminium are added to it. After drying under nitrogen, approximately 60 kg of prepolymer (F) are obtained in the form of a powder consisting of particles with a mean diameter by mass of 255 microns and containing $1.75 \times 10^{-2}$ milligram atoms of chromium per gram and less than 2.0% by weight of polymer soluble in n-hexane at 60° C.

FLUIDISED BED POLYMERISATION

One operates by means of a stainless steel fluidised bed reactor with a diameter of 45 cm, fluidisation being provided by a rising gas mixture propelled at a velocity of 60 cm/s, at a temperature of 106° C.; this gas mixture consists of hydrogen, ethylene and nitrogen, the partial pressures (pp) of these three ingredients being as follows:
pp hydrogen=0.96 MPa
pp ethylene=0.80 MPa
pp nitrogen=0.24 MPa There are introduced into this reactor 70 kg of an anhydrous polyethylene powder which is carefully degassed as charge powder. There are then introduced into this reactor in a sequential manner, at a frequency of once every 7 minutes, 8.5 grams of prepolymer (F) as prepared previously.

At the end of about 3 hours, when the polyethylene production has become regular, there are introduced continuously into the reactor 80 ml/hr of a 0.05 molar solution of tri-n-octylaluminium in n-hexane. By means of sequenced withdrawal, one collects about 30 kg/hr of polyethylene powder, which maintains the fluidised bed at a constant height in the reactor. After 8 hours of operation under these conditions, the charge powder introduced initially into the reactor is practically completely eliminated, and a polyethylene powder is obtained having the following characteristics:
density: 0.954 (at 20° C.);
chromium content: 2.5 ppm;
melt index ($MI_{21.6}$), measured at 190° C. under a charge of 21.6 kg: 21 g/10 minutes;
bulk density: 0.49 g/cm$^3$;
mean diameter by mass of the particles: 1000 microns;
width of distribution of molecular weights, Mw/Mn: 7.3;
flow parameter, n: 2.0;

EXAMPLE 6

FLUIDISED BED COPOLYMERISATION

One operates by means of a stainless steel fluidised bed reactor with a diameter of 45 cm, fluidisation being provided by a rising gas mixture propelled at a speed of 70 cm/sec, at a temperature of 92° C.; the gas mixture consists of hydrogen, ethylene, 1-butene and nitrogen, the partial pressures (pp) of these four ingredients being as follows:
pp hydrogen: 0.52 MPa
pp ethylene: 0.80 MPa
pp 1-butene: 0.036 MPa
pp nitrogen: 0.64 MPa
Into this reactor there are introduced 70 Kg of an anhydrous polyethylene powder which is carefully degassed, as charge powder. There are then introduced into this reactor in a sequence at the frequency of once every 15 minutes, 8.5 g of the prepolymer (F) prepared in Example 5.

At the end of about 3 hours the production of copolymer of ethylene and 1-butene has become regular, and there are introduced continuously into the reactor 50 ml/hr of a 0.05 molar solution of tri-n-octylaluminium in n-hexane. By a sequenced withdrawal one collects about 30 kg/hr of copolymer powder which permits to maintain the fluidised bed at a constant height in the reactor. After 8 hours of operation under these conditions, the charge powder initially introduced into the reactor is practically completely eliminated and a powder is obtained of copolymer of ethylene and 1-butene having the following characteristics:
density: 0.918 (at 20° C.);
content by weight of units derived from 1-butene: 7.2%
chromium content: less than 2 ppm:
melt index, $MI_{2.16}$: 0.52 g/10 minutes;
bulk density: 0.35 g/cm$^3$;
mean diameter by mass of the particles: 1100 microns;
Mw/Mn: 6.1
flow parameter, n: 1.90;
unsaturation level of vinyl, vinylidene and vinylene types respectively equal to 0.06, 0.02 and 0.005 per 100 carbon atoms.

We claim:

1. Process for the polymerisation of ethylene, or the copolymerisation of ethylene and at least one higher alpha-olefin comprising 3 to 12 carbon atoms, in the gas phase in a fluidised bed reactor, in the presence of a catalyst comprising a chromium oxide associated with a granular refractory oxide support which catalyst has been activated by thermal treatment at a temperature of at least 250° C. and at most equal to the temperature at which the granular support commences to sinter, the activation being carried out in a non-reducing atmosphere, which process is characterised in that the catalyst is used in the polymerisation or copolymerisation in the form of dry catalytically active particles of prepolymer which are obtained during a separate prepolymerisation operation comprising bringing the said catalyst into contact with ethylene or, with a mixture of ethylene and at least one higher alpha-olefin comprising 3 to 12 carbon atoms, in suspension in a liquid hydrocarbon medium during a period of time such that the produced prepolymer contains from $4 \times 10^{-5}$ to 3 milligram atoms of chromium per gram and separating the prepolymer from the unreacted quantity of ethylene or the mixture of ethylene with at least one higher alpha-olefin and from the liquid hydrocarbon medium.

2. Process according to claim 1, characterised in that the content by weight of chromium in the catalyst is comprised between 0.05 and 30%.

3. Process according to claim 1, characterised in that the prepolymerisation is performed at a temperature lower than the temperature at which the particles of the prepolymer begin to soften and to form agglomerates.

4. Process according to claim 1, characterised in that the prepolymerisation is performed in the presence of an organo-metallic compound (a) of a metal of groups I to III of Periodic Table of Elements, in a quantity such that the atomic ratio of the quantity of metal in the said organo-metallic compound (a) to the quantity of chromium in the catalyst is comprised between 0.01 and 30.

5. Process according to claim 1, characterised in that the prepolymer is brought into contact with ethylene or a mixture of ethylene and at least one higher alpha-olefin under conditions of polymerisation or copolymerisation in the gas phase in a fluidised bed reactor, in the presence of an organo-metallic compound (b) of a metal of groups I to III of the Periodic Table of Elements, in a quantity such that the atomic ratio of the quantity of metal in the said organo-metallic compound (b) to the quantity of chromium in the catalyst contained in the prepolymer is at most equal to 100.

6. Process according to claim 1, characterised in that the polymerisation or copolymerisation in the gas phase in the fluidised bed reactor is performed using a gas comprising ethylene or a mixture of ethylene and at least one higher alpha-olefin, and circulating at a fluidisation velocity comprised between 40 and 120 cm/sec, under a total pressure comprised between 0.5 and 4 MPa, at a temperature of at least 50° C. and lower than the temperature at which the particles of the polymer or of the copolymer begin to soften and to form agglomerates.

7. Process according to claim 6, characterised in that the gas mixture comprises hydrogen in a quantity such that the molar ratio of hydrogen to ethylene and any higher alpha-olefin is comprised between 0 and 5.

8. Process according to claim 1, wherein the activation is carried out in an oxidising atmosphere; and wherein the produced prepolymer contains from $10^{-3}$ to $10^{-1}$ milligram atoms of chromium per gram.

9. Process according to claim 2, characterised in that the content by weight of chromium in the catalyst is comprised between 0.1 and 3%.

10. Process according to claim 1, characterised in that the prepolymer occurs in the form of a powder consisting of particles having a mean diameter by mass comprised between 80 and 500 microns.

11. Process according to claim 3, characterised in that the prepolymerisation is performed at a temperature comprised between 40 and 115° C.

12. Process according to claim 4, characterised in that the atomic ratio of the quantity of metal in the said organo-metallic compound (a) to the quantity of chromium in the catalyst is comprised between 0.1 and 1.

13. Process according to claim 5, characterised in that the atomic ratio of the quantity of metal in the said organo-metallic compound (b) to the quantity of chromium in the catalyst contained in the prepolymer is comprised between 0.1 and 20.

14. Process according to claim 6, characterised in that the fluidisation velocity is comprised between 50 and 100 cm/sec, and the temperature is at least 50° C. and lower than 115° C.

15. Process according to claim 7, characterised in that the molar ratio of hydrogen to ethylene and any higher alpha-olefin is comprised between 0.1 and 1.

16. Process according to claim 5, wherein the organo-metallic compound (b) is a trialkyl aluminium, an alkyl aluminium hydride, or an alkyl aluminium alcoholate.

* * * * *

UNITED STATES PATENT AND TRADEMARK OFFICE
CERTIFICATE OF CORRECTION

PATENT NO. : 4,910,271

DATED : March 20, 1990

INVENTOR(S) : JEAN-CLAUDE A. BAILLY et al

It is certified that error appears in the above-identified patent and that said Letters Patent is hereby corrected as shown below:

Col. 16, line 43
Claim 1, l. 16, insert a comma (,) after "ethylene" and strike the comma (,) after "or".

Signed and Sealed this

Eighteenth Day of February, 1992

Attest:

HARRY F. MANBECK, JR.

*Attesting Officer*          *Commissioner of Patents and Trademarks*